United States Patent
Hung

(10) Patent No.: US 12,282,626 B2
(45) Date of Patent: Apr. 22, 2025

(54) TEST METHOD FOR COMBINATION OF TOUCH SENSITIVE PROCESSING APPARATUS AND TOUCH PANEL, TOUCH SENSITIVE PROCESSING METHOD, APPARATUS, NON-TRANSITORY COMPUTER READABLE MEDIUM, AND TOUCH SYSTEM THEREOF

(71) Applicant: EGALAX_EMPIA TECHNOLOGY INC., Taipei (TW)

(72) Inventor: Chih-Ming Hung, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/493,836

(22) Filed: Oct. 25, 2023

(65) Prior Publication Data

US 2024/0411404 A1    Dec. 12, 2024

(30) Foreign Application Priority Data

Jun. 9, 2023   (TW) .................................. 112121559

(51) Int. Cl.
*G06F 3/041*   (2006.01)
*G06F 3/044*   (2006.01)

(52) U.S. Cl.
CPC ........ *G06F 3/0418* (2013.01); *G06F 3/04166* (2019.05); *G06F 3/044* (2013.01); *G06F 2203/04103* (2013.01)

(58) Field of Classification Search
CPC .... G06F 3/0418; G06F 3/04166; G06F 3/044; G06F 2203/04103
See application file for complete search history.

(56) References Cited

U.S. PATENT DOCUMENTS

| | | | |
|---|---|---|---|
| 2012/0146941 A1* | 6/2012 | Shin | G06F 3/044 345/174 |
| 2013/0100069 A1* | 4/2013 | Kwon | G06F 3/0446 345/174 |
| 2013/0127774 A1* | 5/2013 | Hong | G06F 3/0446 345/174 |
| 2015/0070299 A1* | 3/2015 | Chae | G06F 3/0445 345/174 |
| 2016/0357307 A1* | 12/2016 | Zhang | G06F 3/0446 |
| 2017/0108990 A1* | 4/2017 | Min | G06F 3/04182 |
| 2017/0153762 A1* | 6/2017 | Kim | G06F 3/0418 |
| 2018/0121016 A1* | 5/2018 | Yeh | G06F 3/04166 |
| 2021/0200415 A1* | 7/2021 | Jun | G09G 3/20 |
| 2023/0125866 A1* | 4/2023 | Jang | G06F 3/04166 345/173 |
| 2024/0241600 A1* | 7/2024 | Lee | G06F 3/0412 |

* cited by examiner

*Primary Examiner* — Jose R Soto Lopez
(74) *Attorney, Agent, or Firm* — WPAT, PC

(57) ABSTRACT

A test method for a combination of touch sensitive processing apparatus and touch panel. The test method is configured to find out whether a stored time difference value with regard to driving signals is appropriate for the combination. If not, the test method is further configured to test several candidate time difference values for finding out one or a best one, which can be stored in a non-firmware of a non-volatile memory as a parameter for further touch sensitive processing. When none of the candidate time difference values is appropriate, the combination is determined as disqualified.

17 Claims, 8 Drawing Sheets

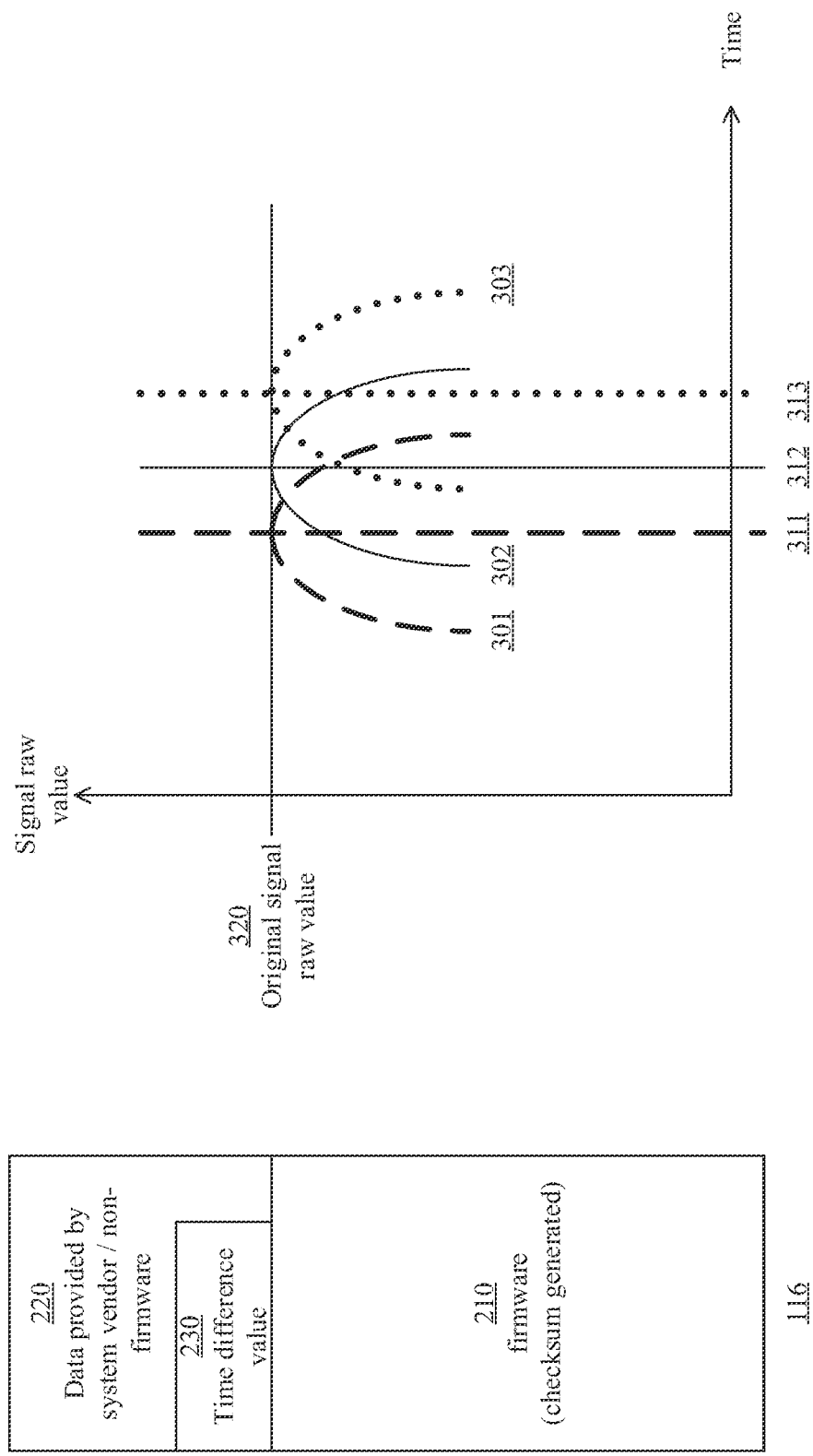

TEST METHOD FOR COMBINATION OF TOUCH SENSITIVE PROCESSING APPARATUS AND TOUCH PANEL, TOUCH SENSITIVE PROCESSING METHOD, APPARATUS, NON-TRANSITORY COMPUTER READABLE MEDIUM, AND TOUCH SYSTEM THEREOF

CROSS REFERENCE TO RELATED PATENT APPLICATION

This patent application is based on a Taiwan, R.O.C. patent application No. 112121559 filed on Jun. 9, 2023.

FIELD OF THE INVENTION

The present invention relates to touch sensitive function, and more particularly, to methods for detecting manufacture process variations of touch system and calibration.

BACKGROUND OF THE INVENTION

Touch panel or screen is one of common input devices of modern electronic systems. Common seen touch panel or screen is controlled by touch sensitive processing apparatus. And the touch sensitive processing apparatus usually utilizes mutual-capacitance or self-capacitance principles to detect touches on the touch panel or screen via its touch electrodes.

While being in industrial manufacture processes, there exists some errors of the electrodes of the touch panel or screen. Not alone, analog front-end components of the touch sensitive processing apparatus also have errors. After the touch sensitive processing apparatus and the touch panel or screen being assembled, these errors may be amplified furthermore which results in failures of touch sensitive functionality. Therefore, the electronic systems equipped with the touch sensitive processing apparatus and the touch panel or screen must be recalled. This increases costs dramatically.

Hence, it exists a need for an integrated detection method to detect combinations of touch sensitive processing apparatuses and touch panel or screens and to find out best parameters for records. The found best parameters can be used in performing touch sensitive detection,

SUMMARY OF THE INVENTION

The present application provides an integrated test method for a combination of touch sensitive processing apparatus and touch panel or touch screen and for selecting a best parameter for record. When touch sensitive processing being performed, the selected and recorded best parameter can be applied to.

According to an embodiment of the present application, a test method for a combination of touch sensitive processing apparatus and touch panel is provided. The test method comprising: based on a first one of N candidate time difference values with regard to driving signals, having the touch sensitive processing apparatus test the touch panel to get a first test result; determining whether the first test result is qualified or not according to the first test result and a normal range and an absolute range corresponding to the first time difference value; and when the first test result is determined as qualified, recording the first test result and its corresponding first time difference value, wherein N is a positive integer larger than 1, wherein the normal range includes the first time difference value, wherein a maximum value of the absolute range is larger than a maximum value of the normal range, a minimum value of the absolute range is smaller than a minimum value of the normal range.

Preferably, when the first result is determined as disqualified, the test may go on the rest of candidate time difference values, the method further comprises: based on an i-th one of N candidate time difference values with regard to driving signals, having the touch sensitive processing apparatus test the touch panel to get an i-th test result; determining whether the i-th test result is qualified or not according to the i-th test result and a normal range and an absolute range corresponding to the i-th time difference value; and when the i-th test result is determined as qualified, recording the i-th test result and its corresponding i-th time difference value, where i is a positive integer which is larger than 1 and less than or equals to N.

Preferably, the method further comprises when the first through the N-th test results are determined as disqualified, the combination is determined as disqualified.

Preferably, in order to end the test as soon as possible, the method further comprises: when the i-th test result is determined as qualified, the combination is determined as qualified; storing the i-th time difference value in a memory space of a non-volatile memory of the touch sensitive processing apparatus; and ending the test method.

Preferably, in order to find a best fit time difference value, the method further comprises: according to one or more recorded test results, finding out a best fit test result among them; storing a time difference value corresponding to the best fit test result in a memory space of a non-volatile memory of the touch sensitive processing apparatus; and ending the test method.

Preferably, in order to exclude particularly poor made touch panel, wherein the step of determining whether the i-th test result is qualified or not further comprises: determining whether any one of time difference signals of the i-th test result is out of the absolute range corresponding to the i-th time difference value; and when there is a time difference signal of the i-th test result is out of the absolute range corresponding to the i-th time difference value, the i-th test result is determined as disqualified.

Preferably, in order to exclude generally poor mad touch panel, wherein the step of determining whether the i-th test result is qualified or not further comprises: determining a number of time difference signals of the i-th test result which are out of the normal range corresponding to the i-th time difference value; and when the number exceeds a number threshold, the i-th test result is determined as disqualified.

Preferably, in order to exclude touch panel with too much total errors, wherein the step of determining whether the i-th test result is qualified or not further comprises: determining a sum of absolute values of time difference signals of the i-th test result which are out of the normal range corresponding to the i-th time difference value; and when the sum exceeds a threshold, the i-th test result is determined as disqualified.

Preferably, in order to determine whether the time difference value stored in the firmware is appropriate, the method further executes firstly following steps: based on a stored raw base time difference value in a firmware stored in a non-volatile memory of the touch sensitive processing apparatus, having the touch sensitive processing apparatus test on the touch panel to get a raw base test result; determining whether the raw base test result is qualified or not according to the raw base test result and a normal range and an absolute range corresponding to the raw base time difference value; and when the raw base test result is determined as qualified, deleting a time difference value stored in the non-volatile memory other than a firmware and ending the test method.

Preferably, in order to pre-determine whether the touch electrodes are broken, the method further executes firstly following steps: having the touch sensitive processing apparatus test on multiple touch electrodes of the touch panel; and when at least one of the touch electrodes is tested as disqualified, the combination is determined as disqualified and ending the test method.

Preferably, in order to find out the best fit time difference value, wherein the step of finding out a best fit test result further comprises: calculating, respectively, an average of time differences of each of the recorded test results; calculating, respectively, an absolute difference between of each of the averages of time differences and its corresponding time difference value; and finding out a minimum of the absolute differences, and its corresponding test result is determined as the best fit test result.

According to an embodiment of the present application, a touch sensitive processing method is provided. The touch sensitive processing method comprising: receiving a RESET instruction; determining whether exists a time difference value stored in a non-firmware of a non-volatile memory of the touch sensitive processing apparatus, wherein the time difference value is the i-th time difference value stored by the test method for a combination of touch sensitive processing apparatus and touch panel; when the determination result is true, reading the time difference value stored in the non-firmware; when the determination result is false, reading a time difference value stored in a firmware of the non-volatile memory; and performing touch sensitive processing according to the read time difference value.

According to an embodiment of the present application, a touch sensitive processing apparatus, comprising a processor for fulfilling the test method of touch sensitive processing apparatus and touch panel as described is provided.

According to an embodiment of the present application, a computer readable medium is provided. When a processor of a touch sensitive processing apparatus loads instructions and data stored in the computer readable medium, the test method of touch sensitive processing apparatus and touch panel or the touch sensitive processing method is fulfilled.

According to an embodiment of the present application, a touch system is provided. The touch system comprises the touch sensitive processing apparatus and the touch panel.

According to the test methods of a combination of touch sensitive processing apparatus and touch panel provided in various embodiments of the present application, the disqualified combinations can be detected. Moreover, a best fit time difference value parameter can be also found such that the disqualified combination may be capable of performing touch sensitive processing when the newly found time difference parameter is applied.

BRIEF DESCRIPTION OF THE DRAWINGS

The advantages and spirit related to the present invention can be further understood via the following detailed description and drawings.

FIG. 2 illustrates a block diagram of contents stored in the non-volatile memory 116 according to an embodiment of the present application.

FIG. 3 illustrates a diagram of driving signal strength and time difference.

DETAILED DESCRIPTION OF THE PREFERRED EMBODIMENT

Figure 1:
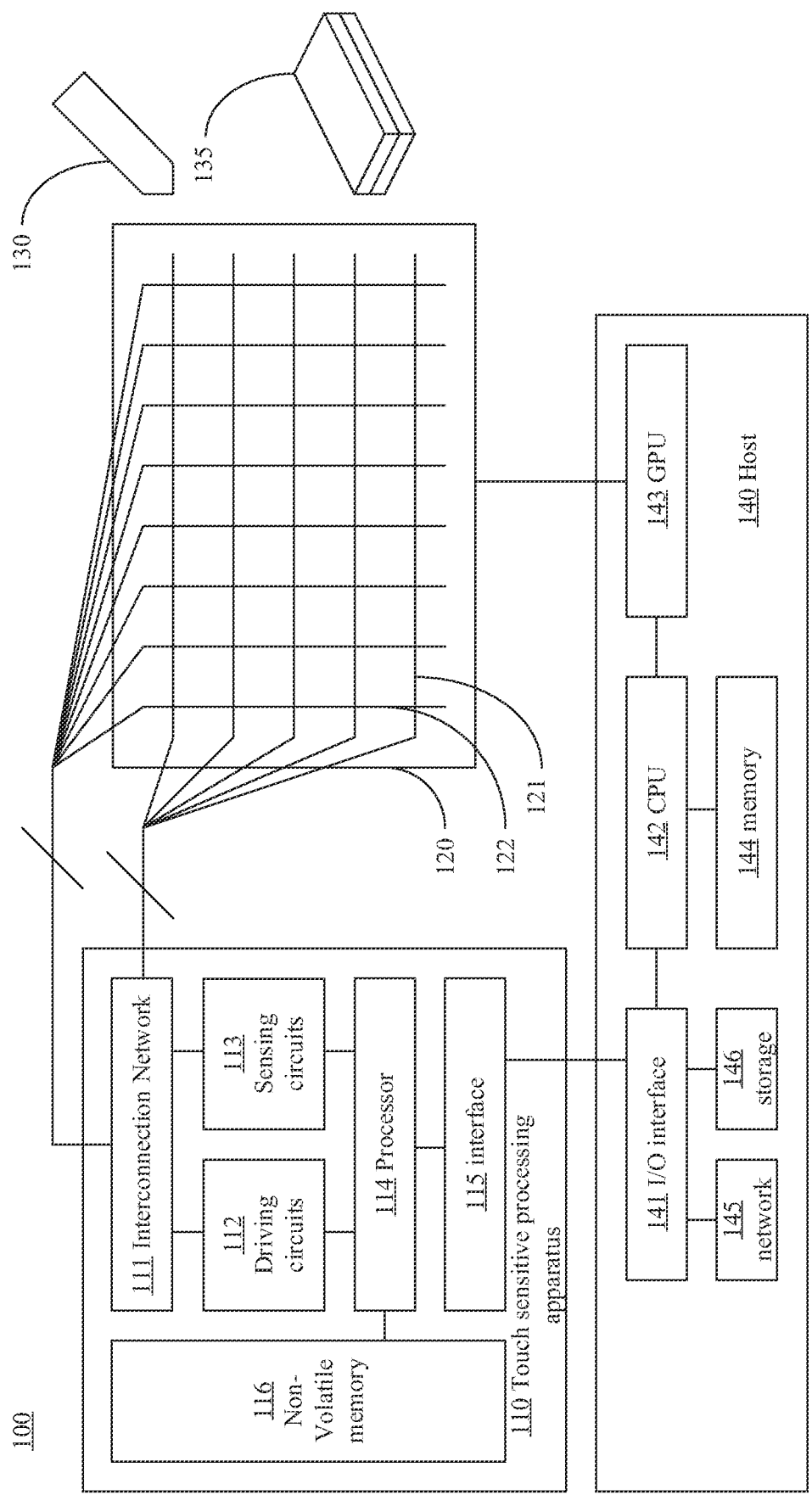
FIG. 1 shows a block diagram of a touch system 100 in accordance with an embodiment of the present application.

Some embodiments of the present application are described in detail below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a block diagram of a touch system 100 in accordance with an embodiment of the present application. The touch system 100 may be a common desktop, laptop, tablet personal computer, industrial control computer, smartphone or any other computer system fulfilling touch sensitive functions.

The touch system 100 may comprise a touch sensitive processing apparatus 110, a touch panel or screen 120 which connects to the touch sensitive processing apparatus 110, and a host 140 which connects to the touch sensitive processing apparatus 110. The touch system 100 may further comprise one or more styli 130 and/or one or more touch board erasers 135. Hereinafter, the touch panel and screen 120 may be collectively referred as the touch screen 120. However, when in an embodiment lack of display function, a person having ordinary skill in the art can understand that the touch screen recited in the application is referred to a touch panel.

The touch screen 120 comprises multiple first electrodes 121 in parallel to a first axis and multiple second electrodes 122 in parallel to a second axis. The first electrodes 121 may intersect with the second electrodes 122 for forming multiple sensing points or areas. Similarly, the second electrodes 122 may intersect with the first electrodes 121 for forming multiple sensing points or areas. In some embodiments, the first electrodes 121 may be referred as first touch electrodes 121, the second electrodes 122 may be referred as second touch electrodes 122. In the present application, the first electrodes 121 and the second electrodes 122 are collectively referred as touch electrodes. In some embodiments of touch screen 120, the first electrodes 121 and the second electrodes 122 are made by transparent materials. The first electrodes 121 and the second electrodes 122 may be resides in a same electrode layer. Conductive sheets of each of the first electrodes 121 or the second electrodes 122 are connected by bridging. The first electrodes 121 and the second electrodes 122 may be resided in different overlapped electrode layers. Unless described specifically, the present application may be applied to the embodiments of single or double electrode layers. The first and the second axes are usually perpendicular to each other. However, the present application does not require that the first axis has to be perpendicular to the second axis. In one embodiment, the first axis may be horizontal axis or the refresh axis of the touch screen 120. The first electrodes 121 and/or the second electrodes 122 may include multiple conductive sheets. Persons having ordinary skill in the art may refer to patent applications of the Applicant in order to understand various embodiments of the first electrodes 121 and/or the second electrodes 122.

The touch sensitive processing apparatus 110 may comprise following hardware circuit modules: an interconnection network module 111, a driving circuit module 112, a sensing circuit module 113, a processor module 114, an interface module 115, and a non-volatile memory 116. The touch sensitive processing apparatus 110 may be implemented in a single chip of integrated circuits, which may encapsulate one or more dies. The touch sensitive processing apparatus 110 may be implemented by multiple chips of integrated circuits and a circuit board connecting these chips. The touch sensitive processing apparatus 110 may be implemented in the same IC or chip which comprise the host 140. In other words, the application does not limit how the touch sensitive processing apparatus 110 implements.

The interconnection network module 111 is configured to connect the first electrodes 121, the second electrodes 122 of the touch screen 120, respectively. The interconnection network module 111 may receive control commands of the processor module 114 for connecting the driving circuit module 112 with any one or more touch electrodes, for connecting the sensing circuit module 113 with any one or more touch electrodes, too. The interconnection network module 111 may comprise a combination of one or more multiplexers to fulfill the mentioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 311 according to control commands of the processor module 314. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 330 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. At the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor 114 may comprises processors widely adopted in the industry such as 8051 series, Intel 1960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I$^2$C, peripheral component interconnect (PCI), PCI-Express, IEEE 1394 and other industrial standard input/output interface.

The touch sensitive processing apparatus 110 connects to the host 140 via the interface module 115.

The non-volatile memory 116 may include readable and writable memory such as EEPROM or flash memory, which keeps content without power supply. The processor 114 may load and execute firmware stored in the non-volatile memory in order to realize touch sensitive functionality. The firmware may include a real-time operating system, corresponding instructions and programs operated by the processor 114. In one embodiment, the instructions and data contained in the firmware may be used to have the touch sensitive processing apparatus realizing the embodiments provided by the present application.

The touch system 100 may comprise one or more styli 130 and/or touch board erasers 135. The stylus 130 and touch board eraser 135 may be transmitters which emit electrical signals. The transmitters may include active transmitter which actively emits electrical signals or passive transmitters which emit electrical signals in response to external electrical signals. The stylus 130 and touch board eraser 135 may comprise one or more electrodes which is configured to receive electrical signals from the touch screen 120 synchronously or asynchronously, or to transmit electrical signals to the touch screen 120 synchronously or asynchronously. The electrical signals may be modulated according to one or more of the aforementioned modulation methods.

The stylus 130 or touch board eraser 135 may be conductor which is configured to transmit driving signals or to be grounded via user's hand or body. The stylus 130 or touch board eraser 135 may be physically or wirelessly connected to an I/O interface 141 of the host 140 or any other interfacing circuits of the I/O interface 141.

The touch sensitive processing apparatus 110 may detect one or more external objects such as fingers, palms or passive styli 130 or touch board erasers 135, or active styli 130 or touch board erasers 135 emitting electrical signals via the touch screen 120. The touch sensitive processing apparatus 110 may utilize mutual-capacitance sensing or self-capacitance sensing to detect external conductive objects. The styli 130 or touch board erasers 135 and touch sensitive processing apparatus 110 may use the aforementioned modulation and demodulation methods to transmit message via the electrical signals. The touch sensitive processing apparatus 110 may detect one or more positions where the styli 130 or touch board erasers 135 touch or approach the touch screen 120, status or sensors (pressure sensor or button) onboard the stylus 130 or touch board eraser 135, orientation angle or inclination angle of the stylus 130 or touch board eraser 135 with respect to the touch screen 120, and etc. according to the electrical signals.

The host 140 is a main apparatus for controlling the touch system 100. It may comprise an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 346 may store normal operating system and application programs executable under the operating system. The network interface module 345 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other circuits or modules of the touch system 100.

The optional graphics processor (GPU) module 143 is usually configured to handle computations with respect to graphics outputs. The graphics processor module 143 may connect to the touch screen 120 for controlling outputs of the touch screen 100. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

In the mutual-capacitance detection, the driving circuit module 112 may provide driving signals to one of the first electrodes 121 in a time-sharing manner. When the driving signals being provided, the sensing circuit module 113 is commanded to have multiple sensing on all of the second electrodes 122 simultaneously in order to gather multiple one-dimensional arrays of sensing information. Each one-dimensional array includes the sensing results with regard to each of the second electrodes 122. A two-dimensional arrays of sensing information or a sensing image may be formed by the multiple one-dimensional arrays of sensing information according to the sequence of the first electrodes 121 emitting the driving signals. According to the two-dimensional arrays or the sensing image, the processor module 114 may detect whether there exists an external conductive object approximating or touching the touch screen 120.

Please refer to FIG. 2, which illustrates a block diagram of contents stored in the non-volatile memory 116 according to an embodiment of the present application. As shown in FIG. 2, a part of the non-volatile memory 116 stores a firmware 210. Another part of the non-volatile memory 116 stores data provided by system vendor 220. The processor 114 of the touch sensitive processing apparatus 110 loads the instructions and data to fulfill the touch sensitive functionality. Hence, in order to prevent content of the firmware 210 being altered, a checksum would be generated with regard to the firmware 210. Persons having ordinary skill in the art can understand some methods such as CRC (cyclic redundant check), MD5, and SHA etc. When the firmware 210 matches with the predetermined checksum, the version of the firmware 210 is a correct one for the touch sensitive processing apparatus 110. When a new version of the firmware 210 is available, a firmware update program may be used to verify the new version with a new checksum. In case they are matched, the host 140 may replace the existing version of firmware 210 stored in the non-volatile memory 116 with the new version of firmware 210.

As described above, the firmware 210 includes instructions and data for fulfilling touch sensitive functionality. Among the data, one of them is related to a time difference between a timing of emitting driving signals and another timing of sensing. In an ideal design or in a gold sample, it comprises an ideal touch sensitive processing apparatus 110 and an ideal touch screen 120. In the ideal design or the gold sample, the driving signals are emitted from the driving signal circuit 112. Sequentially, a range of time duration that the driving signals propagates through the interconnection network 111, the first electrode 121, the second electrode 122, the interconnection network 111 and reaches the sensing circuit module 113 is referred to as a raw base range.

In one embodiment, the raw base range may be calculated according to multiple signal values of standard samples. For example, the calculation may be taken on more than fifty signal values. The raw base range includes a maximum value and a minimum value, which are corresponding to a maximum one and a maximum one of these signal values, respectively. They would be recorded in the firmware 210. Besides, a base time difference can be generated according to the raw base range as a parameter of touch sensitive functionality. For example, the base time difference may be an average value, a medium value of the multiple signal values, or an average value of the maximum value and the minimum value. The base time difference may be included in the content of the firmware 210.

However, as described above, errors may be occurred in the manufacture process of the touch sensitive processing apparatus 110 and the touch screen 120. Each of the sensing information of the two-dimensional array may be fallen out of the raw base range. When it does fall out of the raw base range, it may lead to error of the calculated touch position. In some cases, wrong touch positions (so-called ghost points) may be generated.

Please refer to FIG. 3, which illustrates a diagram of driving signal strength and time difference. The horizontal axis of FIG. 3 represents time. The vertical axis represents raw signal value or sensing information. Because of the manufacture process errors, among three different combinations of touch sensitive processing apparatus 110 and touch panel 120, there may exists three driving signals 301, 302, and 303 which are corresponding to three different time differences 311, 312, and 313 when these driving signals reaching an original signal raw value 320. Each of these time differences may corresponds to one intersection of the first electrodes 121 and the second electrodes 122.

When these three time differences 311, 312, and 313 all fall in the raw base range, an error of a touch position calculated by the touch sensitive processing apparatus should be in an acceptable range. However, if there is one time difference out of the raw base range, the error of touch position calculated by the touch sensitive processing apparatus may be out of the acceptable range. Hence, it needs to confirm the raw base range at first. After that, tests are applied to different combinations of touch sensitive processing apparatus 110 and touch panel 120 to find out whether exists a time difference is out of the raw base range. Second, there exists difference between a combination of touch sensitive processing apparatus 110 and touch panel 120 and the gold sample which is used to determine the raw base signal. These tests may be used to find out an appropriate time difference adopted to the combination. And the touch sensitive processing of the combination would be performed according to the appropriate time difference.

Figure 4:
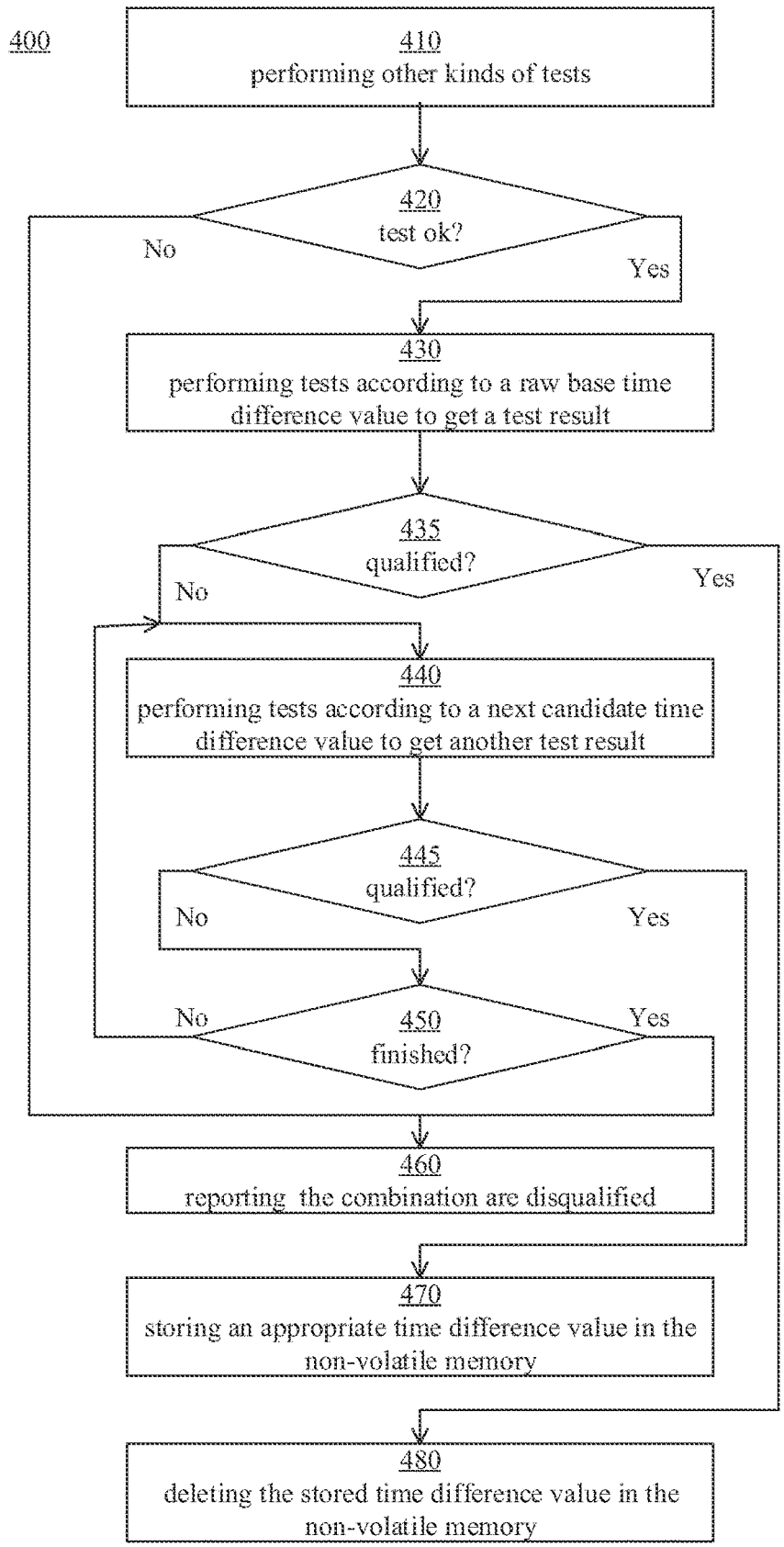
FIG. 4 illustrates a flowchart diagram of a test method 400 of a combination of touch sensitive processing apparatus and touch panel in accordance with an embodiment of the present application.

Please refer to FIG. 4, which illustrates a flowchart diagram of a test method 400 of a combination of touch sensitive processing apparatus and touch panel in accordance with an embodiment of the present application. The test method 400 of a combination of touch sensitive processing apparatus and touch panel may be applied to the touch system 100 as shown in FIG. 1. In one embodiment, an application program executed by the CPU 142 of the host 140 which controls the touch sensitive processing apparatus 110 via the I/O interface 141 for fulfilling the test method 400 of a combination of touch sensitive processing apparatus and touch panel. If there is no causal relation between any two steps, the present application does not limit the execution order of these two steps. The test method 400 of a combination of touch sensitive processing apparatus and touch panel may begin at step 410 or step 430.

Optional step 410: performing other kinds of tests. In one embodiment of the present application, tests may be performed on the touch electrodes to find out open circuits. Moreover, tests may be performed on the touch electrodes to find out shorted circuits. The open circuits are referred to that the touch electrodes or corresponding circuits in the interconnection network 111 are broken during the manufacture process. The shorted circuits are referred to that the touch electrodes or corresponding circuits in the interconnection network 111 are connected to other circuits or cross talked to other circuits to have serious interference. Next, the flow may proceed to step 420. In one embodiment, the tests are applied to all the first electrodes 121 and all the second electrodes 122.

Optional step 420: determining whether the results of the other kinds of tests are good. When there exists one or more unqualified first electrodes 121 or second electrodes 122, the flow would proceed to step 460. Otherwise, the flow proceeds to step 430.

Step 430: performing tests according to a raw base time difference value to get a test result. When abovementioned mutual capacitance detection being performed, the touch sensitive processing apparatus 110 may use a base time difference value of the stored firmware 210 as a sampling timing to test on driving signals. The test results are a two-dimensional time difference signal array. The two-dimensional time difference signal array may be referred to as a time difference signal image. Next, the flow may proceed to step 435. In one embodiment, the test results may be transmitted to the host 140.

Figure 7:
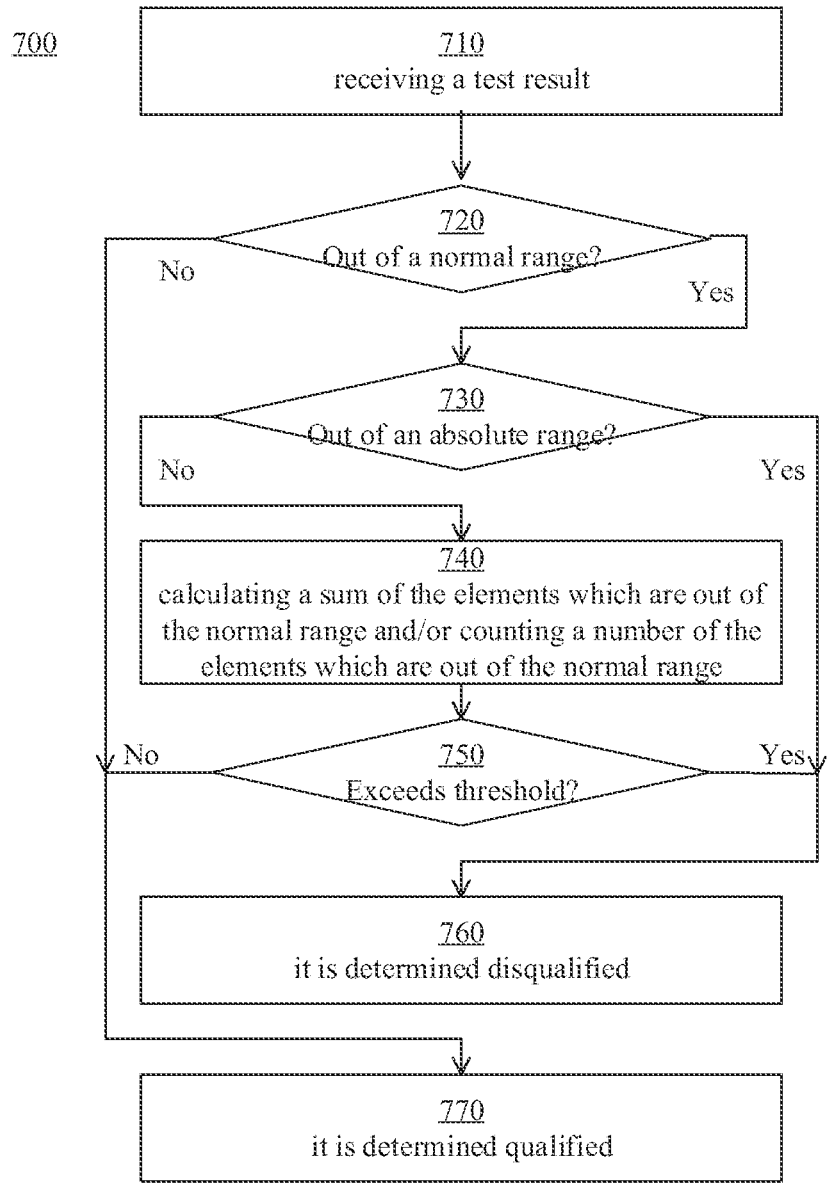
FIG. 7 illustrates a flowchart diagram of a method 700 for determining whether test results are qualified in accordance with an embodiment of the present application.

Step 435, based on the test results gathered at step 430, determining whether the combination of touch sensitive processing apparatus 110 and touch panel 120 is qualified or not. The embodiment of this step 435 may be the test method 700 of time difference signal image as shown in FIG. 7. The step 435 may be implemented by the CPU 142 of the host 140, or alternatively by the touch sensitive processing apparatus 110. When the combination of touch sensitive processing apparatus 110 and the touch panel 120 is determined qualified, the flow may proceed to step 480 or finish. When the combination is determined disqualified, the flow may proceed to step 440.

Step 440: performing tests according to a next candidate time difference value to get another test result. In the present application, there may be several candidate time difference values for sampling the driving signals. These candidate time difference values may be sorted into an ordered sequence based on their values. In one embodiment, it may choose one of the candidate time difference values based on their values. In another embodiment, one of the candidate time difference values is chosen randomly. In this step, the sequence of candidates does not include a tested candidate time difference value. Next, the flow proceeds to step 445.

Step 445: based on the test results gathered at step 440, determining whether the combination of touch sensitive processing apparatus 110 and touch panel 120 is qualified or not. The embodiment of this step 445 may be the test method 700 of time difference signal image as shown in FIG. 7. The step 445 may be implemented by the CPU 142 of the host 140, or alternatively by the touch sensitive processing apparatus 110. When the combination of touch sensitive processing apparatus 110 and the touch panel 120 is determined qualified, the flow may proceed to step 470 or finish. When the combination is determined disqualified, the flow may proceed to step 450.

Step 450: determining whether the tests are finished. In other words, determining whether there exists an untested candidate time difference value. If there does exist an untested candidate time difference, the flow returns to step 440. Otherwise, the flow proceeds to step 460.

Step 460: reporting that the test results of the combination are disqualified. In one embodiment, the application program executed by the host 140 informs a user of the touch system 100 via an output device that the combination of touch sensitive processing apparatus and touch panel is disqualified. The output device may be a normal screen, a touch screen, and/or a printer.

Step 470: storing an appropriate time difference value in the non-volatile memory. In the embodiment as shown in FIG. 2, the appropriate time difference value may be stored as the time difference value 230 in the data provided by system vendor 220.

Optional step 480: deleting the stored time difference value in the non-volatile memory. In the embodiment as shown in FIG. 2, the step deletes the time difference value 230 stored in the data provided by system vendor 220 for preventing mistakes. In an alternative embodiment, the time difference value 230 stored in the data provided by system vendor 220 may be deleted before performing the test method 400 of a combination of touch sensitive processing apparatus and touch panel.

The tests performed at steps 430 and 440 get a two-dimensional time difference signal image. Each element of the image is corresponding to one intersection of one of the first electrodes 121 and one of the second electrodes 122. Please refer to FIG. 5, which shows a diagram of a range of time difference error 500 in accordance with an embodiment of the present application. The horizontal line 510 represents a time difference value chosen in the tests. This time difference value is viewed as a target time difference value. A normal range may be defined between +10% and −10%. An upper bound of the normal range is marked as reference 520. A lower bound of the normal range is marked as reference 530. An absolute range may be defined between +20% and −20%. An upper bound of the absolute range is marked as reference 540. A lower bound of the absolute range is marked as reference 550.

Figure 5:
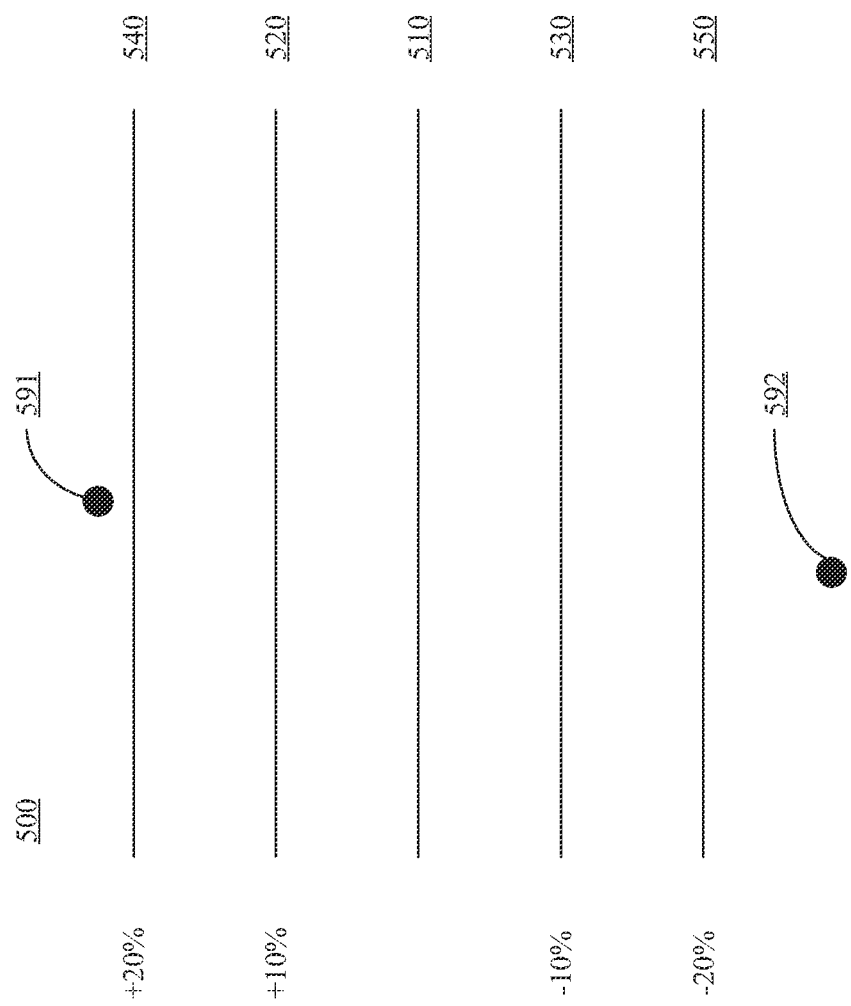
FIG. 5 shows a diagram of a range of time difference error 500 in accordance with an embodiment of the present application.

Persons having ordinary skill in the art can understand that the absolute range is larger than the normal range. In other words, the upper bound 540 of the absolute range is larger than the upper bound 520 of the normal range. The upper bound 520 of the normal range would be larger than the chosen time difference value 510. The chosen time difference value 510 is larger than the lower bound 530 of the normal range. And the lowest bound 530 of the normal range would be larger than the lower bound 550 of the absolute range. Although in the embodiment as shown in FIG. 5, the upper and the lower bounds of the normal range are 10% and −10%, respectively, the present application does not limit that the upper and the lower bounds of the normal range have to be 10% and −10%, respectively. For example, the upper and the lower bounds of the normal range may be 12% and −8%, respectively. Similarly, although in the embodiment as shown in FIG. 5, the upper and the lower bounds of the absolute range are 20% and −20%, respectively, the present application does not limit that the upper and the lower bounds of the absolute range have to be 20% and −20%, respectively. For example, the upper and the lower bounds of the absolute range may be 22% and −18%, respectively.

In the embodiment as shown in FIG. 5, a first time difference value 591 determined by the tests is larger than the upper bound 540 of the absolute range. And a second time difference value 592 determined by the tests is smaller than the lower bound 550 of the absolute range. In one embodiment of the present application, as long as one of the time difference values determined by the tests is larger than the upper bound 540 of the absolute range or smaller than the lower bound 550 of the absolute range, it may determine that the combination of touch sensitive processing apparatus and touch panel is disqualified.

Figure 6:
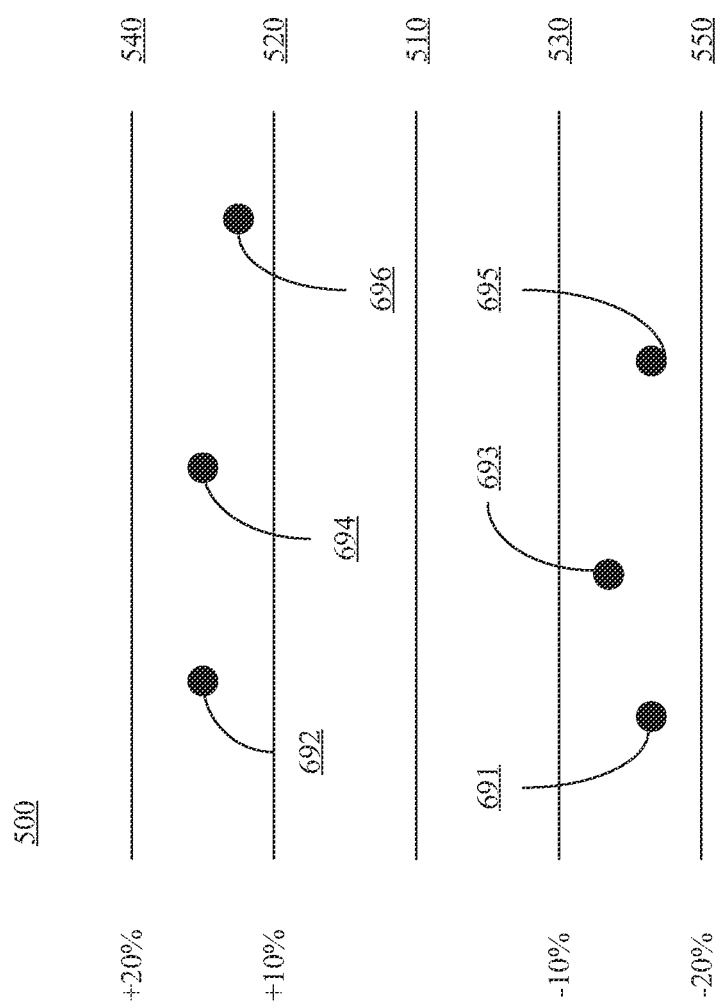
FIG. 6 shows a diagram of a range of time difference error 500 in accordance with an embodiment of the present application.

Please refer to FIG. 6, which shows a diagram of a range of time difference error 500 in accordance with an embodiment of the present application. In the embodiment as shown in FIG. 6, there are six time difference values 691~696 are larger than the upper bound 520 of the normal range or smaller than the lower bound 530 of the normal range. However, these six time difference values are still smaller than the upper bound 540 of the absolute range and larger than the lower bound 550 of the absolute range. In other words, these six time difference values 691~696 are in the absolute range but out of the normal range.

In one embodiment of the present application, a threshold may be set up. When a sum of absolute values of differences between the time difference values in between the normal range and the absolute range and the chosen time difference value is less than the threshold, it may determine that the combination of touch sensitive processing apparatus and touch panel is qualified. In the embodiment as shown in FIG. 6, six difference values between the six time difference values and chosen time difference value 510 can be calculated at first. Next, calculating absolute values of these six difference values to get six absolute difference values. A sum of these six absolute difference values can be calculated. After that, comparing the sum with the threshold. When the sum is larger than the threshold, it is determined that the combination of touch sensitive processing apparatus and the touch panel is disqualified. Reversely, when the sum is smaller than the threshold, it is determined that the combination of touch sensitive processing apparatus and the touch panel is qualified.

In one embodiment of the present application, a number threshold may be set up. A number of the time difference values which are in between the normal range and the absolute range is counted. Next, the counted number and the number threshold are compared. When the counted number is larger than the number threshold, it is determined that the combination of touch sensitive processing apparatus and the touch panel is disqualified. Reversely, when the counted number is smaller than the number threshold, it is determined that the combination of touch sensitive processing apparatus and the touch panel is qualified.

In one embodiment of the present application, when the time difference values in between the normal range and the absolute range must meet the two requirements of the number threshold and the threshold, it is determined that the combination of touch sensitive processing apparatus and the touch panel is qualified.

In an alternative embodiment of the present application, when the time difference values in between the normal range and the absolute range meets at least one of the two requirements of the number threshold and the threshold, it is determined that the combination of touch sensitive processing apparatus and the touch panel is qualified.

In the embodiments as shown in FIGS. 5 and 6, the calculations may be based on time difference values, or may be based on ratios of the time difference values and the chosen time difference value. When the calculations are based on ratios, the thresholds may be represented in percentages. Person having ordinary skill in the art can understand that the calculations based on time different values and the calculations based on ratios are equivalent.

Please refer to FIG. 7, which illustrates a flowchart diagram of a method 700 for determining whether test results are qualified in accordance with an embodiment of the present application. The method 700 may be implemented by the CPU 142 of the host 140 or by the touch sensitive processing apparatus 110. The method 700 may be the embodiment of the step 435 or the step 445 as shown in FIG. 4. The method 700 for determining whether test results may begin at step 710.

Step 710: receiving a test result. As discussed, the test results may be a two-dimensional time difference signal image. Next, the process proceeds to step 720.

Step 720: determining whether there is any element in the two-dimensional time difference signal image out of a normal range. When one or more elements are out of the normal range, the flow proceeds to step 730. Otherwise, the flow proceeds to step 770.

Step 730: determining whether there is any element in the two-dimensional time difference signal image out of an absolute range. When one or more elements are out of the absolute range, the flow proceeds to step 760. Otherwise, the flow proceeds to step 740.

Step 740: calculating a sum of the elements which are out of the normal range and/or counting a number of the elements which are out of the normal range.

Step 750: determining whether the sum is larger than a threshold and/or determining whether the counted number is larger than a number threshold. When one or two of the determination results are positive, the flow proceeds to step 760. Otherwise, the flow proceeds to step 770.

Step 760: it is determined that the combination is disqualified.

Step 770: it is determined that the combination is qualified.

Figure 8:
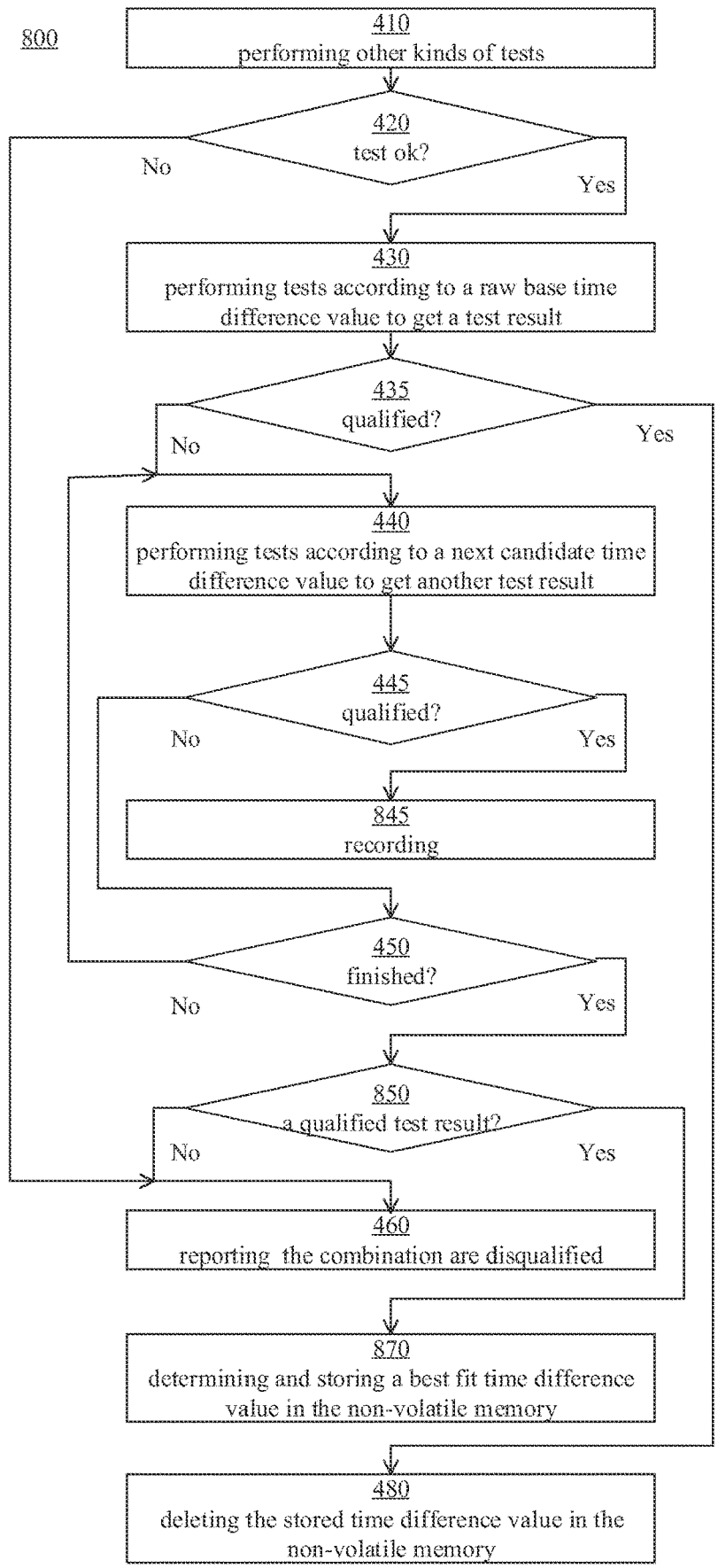
FIG. 8 depicts a flowchart diagram of a test method 800 for a combination of touch sensitive processing apparatus and touch panel in accordance with an embodiment of the present application.

Please refer to FIG. 8, which depicts a flowchart diagram of a test method 800 for a combination of touch sensitive processing apparatus and touch panel in accordance with an embodiment of the present application. The test method 800 for a combination of touch sensitive processing apparatus and touch panel may be applicable to the touch system 100 as shown in FIG. 1. In one embodiment, the test method 800 for a combination of touch sensitive processing apparatus and touch panel may be realized as an application program executed by the CPU 142 of the host 140 for controlling the touch sensitive processing apparatus 110 via the I/O interface 141. If any two steps have no causal relation, the present application does not the execution order of these two steps.

The test method 800 for a combination of touch sensitive processing apparatus and touch panel is a variant of the test method 400 for a combination of touch sensitive processing apparatus and touch panel. The difference between these two test methods 400 and 800 is that the flow of the former would be finished after the qualified time difference is found and stored in the non-volatile memory. The flow of the later would be finished after all of the qualified time differences are found and the best fit one is stored in the non-volatile memory. The former saves time but the found time difference may not be the best one. The later consumes more time but the found time difference may be the best one. The test method 800 for a combination of touch sensitive processing apparatus and touch panel reuses some steps which would not be described again here. The test method 800 for a combination of touch sensitive processing apparatus and touch panel may begin at step 410 or at step 430.

After the test results are determined as qualified at step 445, the flow may proceed to step 845. Step 845: recording qualified test results and corresponding time difference value. In one embodiment, the data may be stored in a non-volatile memory 116. In an alternative embodiment, the data may be stored in the storage 146 of the host 140.

After the test is determined as completed at step 450, the flow may proceed to step 850. Step 850: determining whether there exists a qualified test result. When there exists one or more test results and corresponding time difference values in the non-volatile memory 116 or in the storage 146, the flow may proceed to step 870. Otherwise, the flow may proceed to step 460.

Step 870: determining a best fit time difference value according to the qualified test results and storing the best fit time difference in the non-volatile memory 116. When there is only one qualified test result, its corresponding time difference value would be stored in the non-volatile memory 116. When there are qualified test results, an average value of each elements of each two-dimensional time difference signal image can be calculated. Then an absolute value between the average value and its corresponding time difference value can be calculated. The time difference value corresponds to the minimum absolute value may be considered as the best fit time difference value. Thus, the best fit time difference value may be stored in the non-volatile memory 116.

The embodiments as shown in FIG. 4 and FIG. 8 do not only test whether the combination of touch sensitive processing apparatus and touch panel is qualified but also use the qualified time difference value stored in the non-volatile memory 116 as a parameter for touch sensitive processing.

Figure 9:
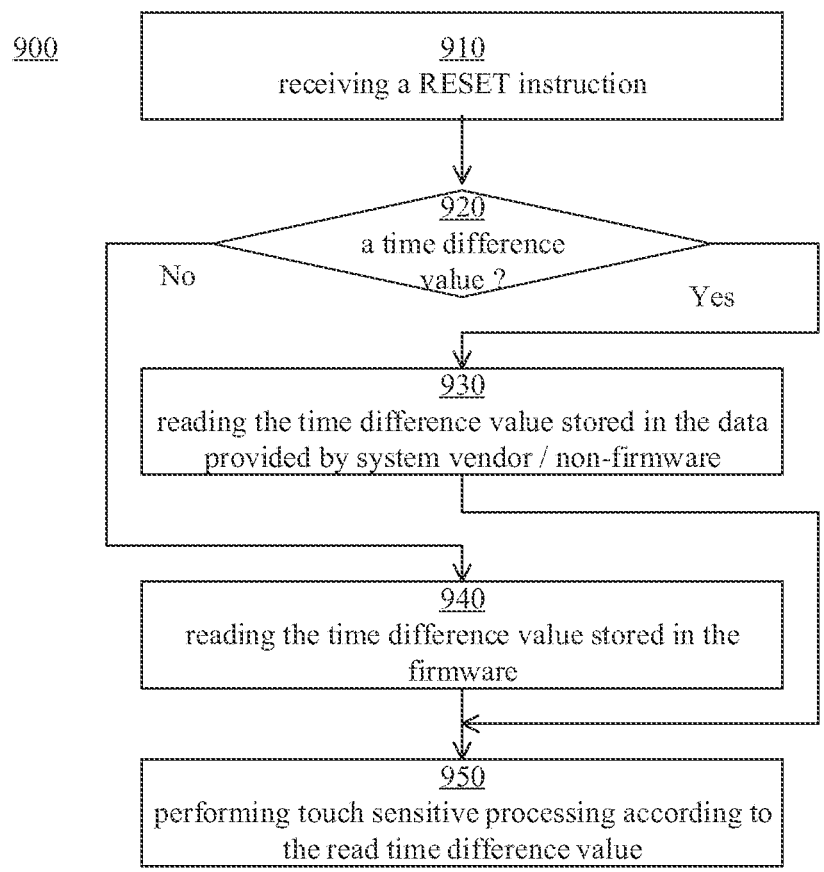
FIG. 9 depicts a flowchart diagram of a touch sensitive processing method 900 in accordance with an embodiment of the present application.

Please refer to FIG. 9, which depicts a flowchart diagram of a touch sensitive processing method 900 in accordance with an embodiment of the present application. The touch sensitive processing method 900 is applicable to the touch sensitive processing apparatus 110 as shown in FIG. 1. In one embodiment, the touch sensitive processing method 900 may be implemented as the firmware 210 as shown in FIG. 2, which includes instructions and data parameters for being read and executed by the processor 114. The touch sensitive processing method 900 may begin at step 910.

Step 910: receiving a RESET instruction. The RESET instruction may be an electric signal transmitted via a hardware pin of the touch sensitive processing apparatus 110 or may be a software triggered instruction. Normally, after being reset, the processor 114 of the touch sensitive processing apparatus 110 may load the firmware 210 and begin to execute instructions of the firmware 210. Next, the flow may proceed to step 920.

Step 920: determining whether there is a time difference value stored in the data provided by system vendor 220 inside the non-volatile memory 116. The stored time difference value may be the time difference value provided according to the embodiments as shown in FIG. 4 or FIG. 8. In case there exists a time difference value, the flow may proceed to step 930. Otherwise, the flow proceeds to step 940.

Step 930: reading the time difference value stored in the data provided by system vendor 220 inside the non-volatile memory 116. Next, the flow may proceed to step 950.

Step 940: reading the time difference value stored in the firmware 210. Next, the flow may proceed to step 950.

Step 950: performing touch sensitive processing according to the read time difference value.

According to an embodiment of the present application, a test method for a combination of touch sensitive processing apparatus and touch panel is provided. The test method comprising: based on a first one of N candidate time difference values with regard to driving signals, having the touch sensitive processing apparatus test the touch panel to get a first test result; determining whether the first test result is qualified or not according to the first test result and a normal range and an absolute range corresponding to the first time difference value; and when the first test result is determined as qualified, recording the first test result and its corresponding first time difference value, wherein N is a positive integer larger than 1, wherein the normal range includes the first time difference value, wherein a maximum value of the absolute range is larger than a maximum value of the normal range, a minimum value of the absolute range is smaller than a minimum value of the normal range.

Preferably, when the first result is determined as disqualified, the test may go on the rest of candidate time difference values, the method further comprises: based on an i-th one of N candidate time difference values with regard to driving signals, having the touch sensitive processing apparatus test the touch panel to get an i-th test result; determining whether the i-th test result is qualified or not according to the i-th test result and a normal range and an absolute range corresponding to the i-th time difference value; and when the i-th test result is determined as qualified, recording the i-th test result and its corresponding i-th time difference value, where i is a positive integer which is larger than 1 and less than or equals to N.

Preferably, the method further comprises when the first through the N-th test results are determined as disqualified, the combination is determined as disqualified.

Preferably, in order to end the test as soon as possible, the method further comprises: when the i-th test result is determined as qualified, the combination is determined as qualified; storing the i-th time difference value in a memory space of a non-volatile memory of the touch sensitive processing apparatus; and ending the test method.

Preferably, in order to find a best fit time difference value, the method further comprises: according to one or more recorded test results, finding out a best fit test result among them; storing a time difference value corresponding to the best fit test result in a memory space of a non-volatile memory of the touch sensitive processing apparatus; and ending the test method.

Preferably, in order to exclude particularly poor made touch panel, wherein the step of determining whether the i-th test result is qualified or not further comprises: determining whether any one of time difference signals of the i-th test result is out of the absolute range corresponding to the i-th time difference value; and when there is a time difference signal of the i-th test result is out of the absolute range corresponding to the i-th time difference value, the i-th test result is determined as disqualified.

Preferably, in order to exclude generally poor mad touch panel, wherein the step of determining whether the i-th test result is qualified or not further comprises: determining a number of time difference signals of the i-th test result which are out of the normal range corresponding to the i-th time difference value; and when the number exceeds a number threshold, the i-th test result is determined as disqualified.

Preferably, in order to exclude touch panel with too much total errors, wherein the step of determining whether the i-th test result is qualified or not further comprises: determining a sum of absolute values of time difference signals of the i-th test result which are out of the normal range corresponding to the i-th time difference value; and when the sum exceeds a threshold, the i-th test result is determined as disqualified.

Preferably, in order to determine whether the time difference value stored in the firmware is appropriate, the method further executes firstly following steps: based on a stored raw base time difference value in a firmware stored in a non-volatile memory of the touch sensitive processing apparatus, having the touch sensitive processing apparatus test on the touch panel to get a raw base test result; determining whether the raw base test result is qualified or not according to the raw base test result and a normal range and an absolute range corresponding to the raw base time difference value; and when the raw base test result is determined as qualified, deleting a time difference value stored in the non-volatile memory other than a firmware and ending the test method.

Preferably, in order to pre-determine whether the touch electrodes are broken, the method further executes firstly following steps: having the touch sensitive processing apparatus test on multiple touch electrodes of the touch panel; and when at least one of the touch electrodes is tested as disqualified, the combination is determined as disqualified and ending the test method.

Preferably, in order to find out the best fit time difference value, wherein the step of finding out a best fit test result further comprises: calculating, respectively, an average of time differences of each of the recorded test results; calculating, respectively, an absolute difference between of each of the averages of time differences and its corresponding time difference value; and finding out a minimum of the absolute differences, and its corresponding test result is determined as the best fit test result.

According to an embodiment of the present application, a touch sensitive processing method is provided. The touch sensitive processing method comprising: receiving a RESET instruction; determining whether exists a time difference value stored in a non-firmware of a non-volatile memory of the touch sensitive processing apparatus, wherein the time difference value is the i-th time difference value stored by the test method for a combination of touch sensitive processing apparatus and touch panel; when the determination result is true, reading the time difference value stored in the non-firmware; when the determination result is false, reading a time difference value stored in a firmware of the non-volatile memory; and performing touch sensitive processing according to the read time difference value.

According to an embodiment of the present application, a touch sensitive processing apparatus, comprising a processor for fulfilling the test method of touch sensitive processing apparatus and touch panel as described is provided.

According to an embodiment of the present application, a computer readable medium is provided. When a processor of a touch sensitive processing apparatus loads instructions and data stored in the computer readable medium, the test method of touch sensitive processing apparatus and touch panel or the touch sensitive processing method is fulfilled.

According to an embodiment of the present application, a touch system is provided. The touch system comprises the touch sensitive processing apparatus and the touch panel.

According to the test methods of a combination of touch sensitive processing apparatus and touch panel provided in various embodiments of the present application, the disqualified combinations can be detected. Moreover, a best fit time difference value parameter can be also found such that the disqualified combination may be capable of performing touch sensitive processing when the newly found time difference parameter is applied.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A test method for a combination of touch sensitive processing apparatus and touch panel, comprising:

based on a first one of N candidate time difference values with regard to driving signals, having the touch sensitive processing apparatus test the touch panel to get a first test result;

based on an i-th one of N candidate time difference values with regard to driving signals, having the touch sensitive processing apparatus test the touch panel to get an i-th test result;

determining whether the first test result is qualified or not according to the first test result and a normal range and an absolute range corresponding to the first time difference value;

determining whether the i-th test result is qualified or not according to the i-th test result and a normal range and an absolute range corresponding to the i-th time difference value; and when the first test result is determined as qualified, recording the first test result and its corresponding first time difference value, when the i-th test result is determined as qualified, recording the i-th test result and its corresponding i-th time difference value, wherein N is a positive integer larger than 1, where i is a positive integer which is larger than 1 and less than or equals to N, wherein the normal range includes the first time difference value, wherein a maximum value of the absolute range is larger than a maximum value of the normal range, a minimum value of the absolute range is smaller than a minimum value of the normal range.

2. The test method as claimed in claim 1, further comprises:

when the first through the N-th test results are determined as disqualified, the combination is determined as disqualified.

3. The test method as claimed in claim 1, further comprises:

when the i-th test result is determined as qualified, the combination is determined as qualified;

storing the i-th time difference value in a memory space of a non-volatile memory of the touch sensitive processing apparatus; and ending the test method.

4. The test method as claimed in claim 1, further comprises:

according to one or more recorded test results, finding out a best fit test result among them;

storing a time difference value corresponding to the best fit test result in a memory space of a non-volatile memory of the touch sensitive processing apparatus; and ending the test method.

5. The test method as claimed in claim 1, wherein the step of determining whether the i-th test result is qualified or not further comprises:

determining whether any one of time difference signals of the i-th test result is out of the absolute range corresponding to the i-th time difference value; and when there is a time difference signal of the i-th test result is out of the absolute range corresponding to the i-th time difference value, the i-th test result is determined as disqualified.

6. The test method as claimed in claim 5, wherein the step of determining whether the i-th test result is qualified or not further comprises:

determining a number of time difference signals of the i-th test result which are out of the normal range corresponding to the i-th time difference value; and when the number exceeds a number threshold, the i-th test result is determined as disqualified.

7. The test method as claimed in claim 5, wherein the step of determining whether the i-th test result is qualified or not further comprises:

determining a sum of absolute values of time difference signals of the i-th test result which are out of the normal range corresponding to the i-th time difference value; and when the sum exceeds a threshold, the i-th test result is determined as disqualified.

8. The test method as claimed in claim 1, further comprises executing following steps prior to executing the steps recited in claim 1:

based on a stored raw base time difference value in a firmware stored in a non-volatile memory of the touch sensitive processing apparatus, having the touch sensitive processing apparatus test on the touch panel to get a raw base test result;

determining whether the raw base test result is qualified or not according to the raw base test result and a normal range and an absolute range corresponding to the raw base time difference value; and when the raw base test result is determined as qualified, deleting a time difference value stored in the non-volatile memory other than a firmware and ending the test method.

9. The test method as claimed in claim 8, further comprises executing following steps prior to executing the steps recited in claim 8:
- having the touch sensitive processing apparatus test on multiple touch electrodes of the touch panel; and
- when at least one of the touch electrodes is tested as disqualified, the combination is determined as disqualified and ending the test method.

10. The test method as claimed in claim 4, wherein the step of finding out a best fit test result further comprises:
- calculating, respectively, an average of time differences of each of the recorded test results;
- calculating, respectively, an absolute difference between of each of the averages of time differences and its corresponding time difference value; and
- finding out a minimum of the absolute differences, and its corresponding test result is determined as the best fit test result.

11. A touch sensitive processing method, applicable to the touch sensitive processing apparatus as recited in claim 3, comprising:
- receiving a RESET instruction;
- determining whether exists a time difference value stored in a non-firmware of a non-volatile memory of the touch sensitive processing apparatus, wherein the time difference value is the i-th time difference value stored by the test method for a combination of touch sensitive processing apparatus and touch panel as recited in claim 3;
- when the determination result is true, reading the time difference value stored in the non-firmware;
- when the determination result is false, reading a time difference value stored in a firmware of the non-volatile memory; and
- performing touch sensitive processing according to the read time difference value.

12. A touch sensitive processing method, applicable to the touch sensitive processing apparatus as recited in claim 4, comprising:
- receiving a RESET instruction;
- determining whether exists a time difference value stored in a non-firmware of a non-volatile memory of the touch sensitive processing apparatus, wherein the time difference value is the i-th time difference value stored by the test method for a combination of touch sensitive processing apparatus and touch panel as recited in claim 4;
- when the determination result is true, reading the time difference value stored in the non-firmware;
- when the determination result is false, reading a time difference value stored in a firmware of the non-volatile memory; and
- performing touch sensitive processing according to the read time difference value.

13. A touch sensitive processing apparatus, comprising a processor for fulfilling the test method of touch sensitive processing apparatus and touch panel as recited in claim 1.

14. A touch sensitive processing apparatus, comprising a processor for fulfilling the touch sensitive processing method as recited in claim 11.

15. A non-transitory computer readable medium, wherein when a processor of a touch sensitive processing apparatus loads instructions and data stored in the non-transitory computer readable medium, the test method of touch sensitive processing apparatus and touch panel as recited in claim 1 is fulfilled.

16. A non-transitory computer readable medium, wherein when a processor of a touch sensitive processing apparatus loads instructions and data stored in the non-transitory computer readable medium, the touch sensitive processing method as recited in claim 11 is fulfilled.

17. A touch system, comprising the touch sensitive processing apparatus and the touch panel as recited in claim 1.

* * * * *